United States Patent [19]

Lister

[11] Patent Number: 5,317,374
[45] Date of Patent: May 31, 1994

[54] METHOD AND APPARATUS FOR MEASURING A DISTANCE TO AN OBJECT FROM DUAL TWO DIMENSIONAL IMAGES THEREOF

[75] Inventor: Peter M. Lister, Johnson City, N.Y.

[73] Assignee: Universal Instruments Corporation, Binghamton, N.Y.

[21] Appl. No.: 951,009

[22] Filed: Sep. 25, 1992

[51] Int. Cl.$^5$ .............................................. G01C 3/00
[52] U.S. Cl. ........................................... 356/3; 356/4
[58] Field of Search ..................... 356/3, 4, 20, 21, 22, 356/144, 146

[56] References Cited

U.S. PATENT DOCUMENTS

| | | | |
|---|---|---|---|
| 1,715,845 | 6/1929 | König | 356/22 |
| 4,009,960 | 3/1977 | Feldman et al. | 356/146 |
| 4,260,220 | 4/1981 | Whitehead . | |
| 4,542,449 | 9/1985 | Whitehead . | |
| 4,791,540 | 12/1988 | Dreyer, Jr. et al. . | |
| 4,993,830 | 2/1991 | Jarrett | 356/4 |

Primary Examiner—Richard A. Rosenberger
Attorney, Agent, or Firm—Wegner, Cantor, Mueller & Player

[57] ABSTRACT

A prismatic viewing plate is situated across the focal axis between an object and an imaging device such as a camera capable of acquiring only a two dimensional image of the object. A characteristic of the prismatic plate is that it presents dual images of the object to the imaging device. Characteristic of the separation between the dual images is that it is dependent upon the distance of the object from the prismatic plate. These characteristics are employed to determine a range to the object by measuring the separation between the dual images, visually or by use of one of the many available machine vision techniques. A third dimension of a surface profile also can be obtained by scanning a spot of light over the object while separately viewing the spot through the prismatic plate and measuring the separation between dual images of the light spot at various points of the scan.

2 Claims, 2 Drawing Sheets

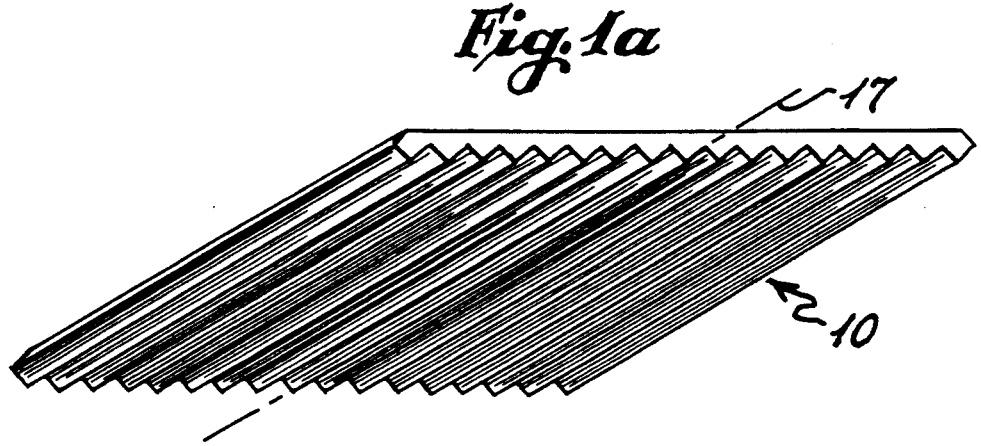
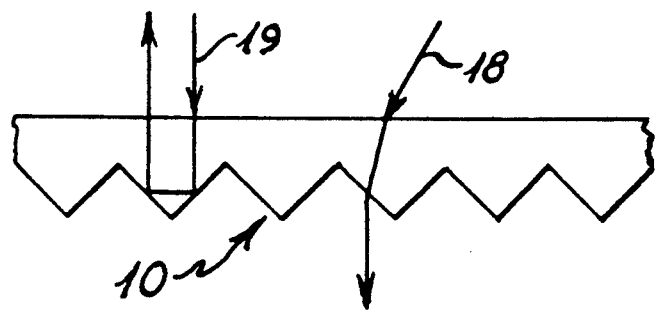
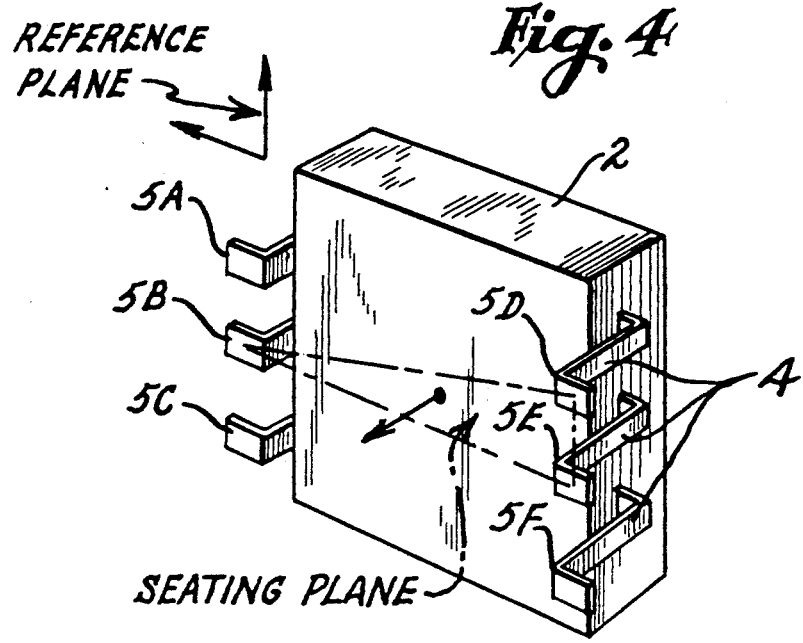

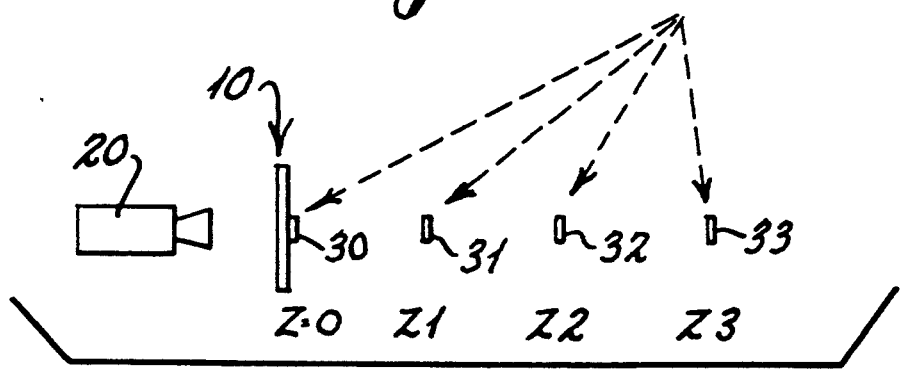
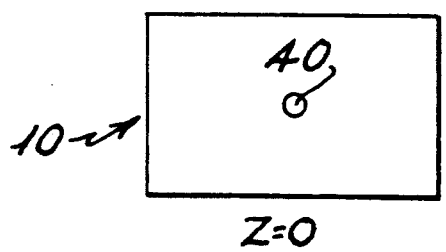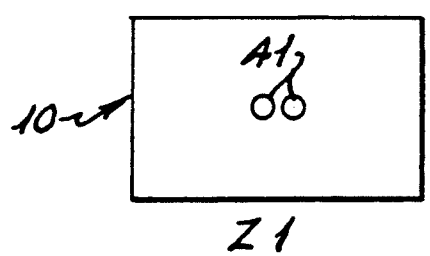
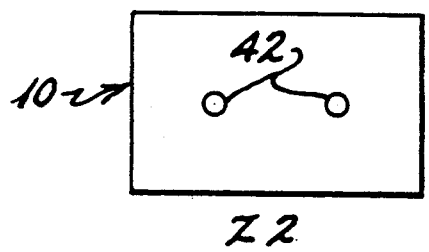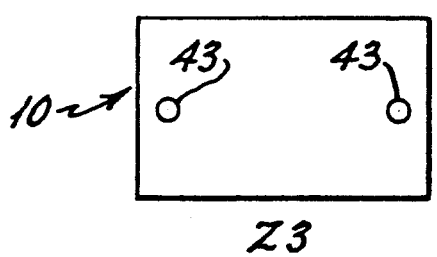

METHOD AND APPARATUS FOR MEASURING A DISTANCE TO AN OBJECT FROM DUAL TWO DIMENSIONAL IMAGES THEREOF

PRIOR ART CROSS REFERENCES

U.S. Pat. No. 4,260,220—PRISM LIGHT GUIDE HAVING SURFACES WHICH ARE IN OCTATURE issued to Lorne A. WHITEHEAD on Apr. 7, 1981.

U.S. Pat. No. 4,542,449—LIGHTING PANEL WITH OPPOSED 45° CORRUGATIONS issued to Lorne A. WHITEHEAD on Sep. 17, 1985.

U.S. Pat. No. 4,791,540—LIGHT FIXTURE PROVIDING NORMALIZED OUTPUT issued to John F. DREYER, Jr. et al. on Dec. 13, 1988.

The subject matter of these cross-references is hereby incorporated, by reference thereto, into the instant disclosure.

BACKGROUND OF THE INVENTION

In various inspection and object locating applications it is important to be able to determine the surface contours of an object in three dimensions, or the location of key features on the surface of an object in three dimensions, or the gross location of an object in three dimensions.

Existing range sensing methods include:

(1) Structured light methods—projecting a fixed pattern onto an object and looking for perturbations in this pattern, from which range information can be inferred.

(2) Triangulation—transmitting light rays from a transmitter onto the object under study and detecting reflections of the rays onto a receiver such as a line scan CCD array located some known distance away from the transmitter. The location of the reflected ray on the array is a measure of the distance between the transmitter and the point on the object from which the ray is reflected.

(3) Laser radar and time of flight—reflecting a collimated, pulsed beam of light off of a point on an object, measuring the flight time of the pulse to and from the transmitter, and determining the distance between the transmitter and the point directly from the flight time.

(4) Stereo—simultaneously viewing the object of interest by means of two or more imaging devices located some known distance apart and using the disparity in image location, from imager to imager, of a given feature on the object in order to determine the distance from the imagers to the feature.

(5) Autofocusing techniques—maximizing the sharpness of edges in an image by adjusting the focal length of the imager and using the focusing adjustment to gauge the distance between the imager and object being viewed.

It is an object of the instant invention to provide a method and apparatus for determining the distance to an object by measuring the separation of dual images of the object.

It is another object of the invention to provide a method and apparatus for determining a third dimension of a surface profile by measuring the separation between dual two dimensional images of various points on the surface.

Still further, it is an object of the invention to provide simplified method and apparatus for determining the coplanarity of points on a plurality of projections of an object.

These and other objects of the invention will become more apparent from the following specification, claims, and drawings.

BRIEF SUMMARY OF THE INVENTION

A prismatic viewing plate is situated across the focal axis between an object and an imaging device such as a camera capable of acquiring only a two dimensional image of the object. A characteristic of the prismatic plate is that it presents dual images of the object to the imaging device. Characteristic is that the separation between the dual images is dependent upon the distance of the object from the prismatic plate. These characteristics are employed to determine a distance to the object by measuring the separation between the dual images, either visually or by use of one of the many available machine vision techniques. A third dimension of a surface profile is obtainable by scanning a spot of light over the object while separately viewing the object through the prismatic plate and measuring the separation between dual images of the light spot at various points of the scan.

BRIEF DESCRIPTION OF THE DRAWINGS

FIG. 1a is an isometric view of a fragmentary of the prismatic viewing plate used in practicing the invention.

FIG. 1b is a fragmentary side elevation of the prismatic plate.

FIG. 2 is schematic illustrating use of the prismatic plate in practicing the instant invention.

FIGS. 3a-3d are the images, acquired by the camera in FIG. 2, of a fiducial situated at each of the ranges $z0-z3$, respectively, as illustrated in FIG. 2.

FIG. 4 is an isometric view of a component for illustrating the definition of the seating plane.

DETAILED DESCRIPTION OF THE INVENTION

Central to practice of the invention is the use of a prismatic plate marketed by the 3M Corporation under the tradename of Scotch Optical Lighting Film (SOLF) material. The patents cross-referenced above provide a good detailed explanation of the properties of this particular prismatic material. In particular, the plate is transparent and has a generally flat smooth surface on one face and a series of parallelly arranged prisms protruding outwardly from the other face and defining a structured surface. The effect of the prisms is to totally internally reflect light rays which enter the plate within a certain cone angle around the perpendicular to the smooth surface of the plate and to normalize other rays so that they exit the structured surface of the plate at angles closer to perpendicular to the smooth surface than the angle at which they entered the smooth surface.

As seen in FIG. 1a, the structured surface of the prismatic plate 10 has a series of parallelly disposed prisms with major axes of the prisms running parallel to axis 17. As seen in FIG. 1b, light beam 19 is perpendicularly incident upon the smooth surface of plate 10 and, thus, is totally internally reflected by the prisms of the structured surface of plate 10. On the other hand, light beam 18 is incident upon the smooth surface of plate 10 at less than 90° and exits the structured surface of the plate at an angle closer to perpendicular than that at which it entered the smooth surface.

In addition to, or as a result of, the above-noted properties of the prismatic material, it has been discovered that, with either the structured or smooth surface of the prismatic plate 10 facing the object being viewed, the image of the object which is viewed through the prismatic plate 10 will double as separation occurs between the object and plate. Further, it has been found that the spacing between the pair of images varies directly with changes in the distance between object and prismatic plate.

For example, FIG. 2 illustrates the physical arrangement of an imager 20, prismatic plate 10 and a series of objects 30, 31, 32, and 33 which are situated at respective locations (z0, z1, z2, and z3) along a Z-axis which is centered on the optical axis of camera 20. In FIG. 2, the prismatic plate 10 is oriented so that the major axes 17 of the prisms are vertically disposed. FIGS. 3a–3c represent the images of the various objects as viewed by imaging device 20 through prismatic plate 10. Since there is no spacing between object 30 and plate 10, as seen in FIG. 2, imager 20 sees the single image 40 (of FIG. 3a) corresponding to object 30. However, the objects z1–z3 of FIG. 2 are variously spaced from prismatic plate 10, so that imager 20 sees the corresponding double images 41–43 of FIGS. 3b–3d.

An explanation of one specific implementation of this discovered property of the prismatic material follows, but other uses of this property of indicating and/or measuring a third dimension of an object by means of the dual images of the object may become apparent to the reader.

As seen in FIG. 4, the tips 5B, 5D and 5E of three of the leads 4 which project the farthest distance below a reference plane of the multilead component 2 define a triangle 6 and, hence, a lead tip plane. The reference plane of the component can be considered the same as the X-Y plane defined by a placement system holding the component on the end of a vacuum nozzle, not shown. The plane defined by the three lead tips may or may not be parallel to this X-Y plane. If any other of the lead tips 5A, 5C and 5F of component 2 project the same distance from the reference plan, then they also will be in the lead tip plane. If the center of gravity vector 8 of the component 2 passes through the envelope defined by the lead tip plane, then the plane is commonly referred to as the "seating plane". If the component 2 is placed and left to stand freely at a position on a flat surface, it will be supported by the seating plane without any rocking motion about an axis perpendicular to the seating plane.

Thus, while the component is still held on the tip of the vacuum nozzle of a placement system, it is possible to determine which lead tips will define the seating plane by determining the distance that each lead tip projects in a direction perpendicular to the reference (X-Y) plane. Then, a determination of the distance of any lead tip from the seating plane will indicate how far above a flat surface that any lead tip will be after placement.

In order to define the seating plane and determine the coplanarity deviation of any lead by the method and apparatus of the instant invention, the prismatic viewing plate 10 is oriented generally parallel to the reference (X-Y) plane and is situated between a vision camera and the component. Typically, the component is held by vacuum to the tip of a "pick and place" nozzle (not shown), with the bottom of the component facing a camera so that the tip of each lead is locatable in X and Y (i.e., two dimensionally). Then, upon positioning the viewing plate 10 between this camera and the component, the distance from the X-Y plane of the lead tips can be determined by viewing the double images of each lead tip and comparing the separation between each pair of images relative to a standard or scale.

Thus, it will be seen that the objects set forth above, among those made apparent from the preceding description, are efficiently attained and, since certain changes may be made in the construction set forth without departing from the scope of the invention, it is intended that all matter contained in the above description or shown in the accompanying drawings shall be interpreted as illustrative and not in a limiting sense.

It is to be understood also that the following claims are intended to cover all of the generic and specific features of the invention herein described, and all statements of the scope of the invention which, as a matter of language, might be said to fall therebetween.

Now that the invention has been described, I claim:

1. A method for determining coplanarity deviation of any lead tip of a multilead component from a seating plane, and comprising the steps of:
   providing a prismatic plate and vision camera;
   establishing a reference plane;
   situating said prismatic plate generally parallel to said reference plane and spaced from said multilead component and generally perpendicularly intersecting a focal axis between said component and said vision camera;
   acquiring dual images of each said lead tip via said prismatic plate;
   determining a tip distance from said reference plane to each said lead tip according to a corresponding separation distance between said dual images corresponding to each said lead tip; and
   comparing each said tip distance and defining said seating plane by tips of at least three leads which are farthest from said reference plane; and
   determining a distance of projection of each remaining lead tip relative to said seating plane.

2. An apparatus for determining coplanarity deviation of each lead tip of a multilead component from a seating plane, and comprising:
   a prismatic plate and a vision camera spaced from said primsatic plate;
   means for establishing a reference plane;
   means for situating said prismatic plate generally parallel to said reference plane and spaced from said multilead component and generally perpendicularly intersecting a focal axis between said component and said vision camera;
   means for acquiring dual images of each said lead tip via said prismatic plate;
   means for determining a tip distance from said reference plane to each said lead tip according to a corresponding separation distance between said dual images which correspond to each said lead tip; and
   means for comparing each said tip distance and defining said seating plane by tips of at least three leads which are farthest from said reference plane; and
   means for determining a distance of any remaining lead tip relative to said seating plane.

* * * * *